United States Patent
Mizui

(10) Patent No.: US 10,106,039 B2
(45) Date of Patent: Oct. 23, 2018

(54) REGENERATION CONTROL DEVICE OF ELECTRICALLY DRIVEN VEHICLE

(71) Applicant: MITSUBISHI JIDOSHA KOGYO KABUSHIKI KAISHA, Tokyo (JP)

(72) Inventor: Toshifumi Mizui, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/226,373

(22) Filed: Aug. 2, 2016

(65) Prior Publication Data

US 2017/0036547 A1 Feb. 9, 2017

(30) Foreign Application Priority Data

Aug. 3, 2015 (JP) .................. 2015-153593

(51) Int. Cl.
*B60L 7/18* (2006.01)
*B60L 7/10* (2006.01)
(Continued)

(52) U.S. Cl.
CPC ........ *B60L 7/18* (2013.01); *B60L 7/10* (2013.01); *B60L 7/14* (2013.01); *B60L 7/26* (2013.01);
(Continued)

(58) Field of Classification Search
CPC ............... B60L 7/10; B60L 7/14; B60L 7/18; B60L 7/26; B60L 11/1861; B60L 2240/12;
(Continued)

(56) References Cited

U.S. PATENT DOCUMENTS 5,583,406 A 12/1996 Mutoh et al.
6,459,980 B1 10/2002 Tabata et al.
(Continued)

FOREIGN PATENT DOCUMENTS

CN 103895519 A 7/2014
CN 104246314 A 12/2014
(Continued)

OTHER PUBLICATIONS

Extended European Search Report dated Dec. 14, 2016 in corresponding European Application No. 16182142.6.
Chinese Office Action and Search Report for Chinese Application No. 201610625929.2, dated Jun. 5, 2018, with English translation.

*Primary Examiner* — Aaron L Troost
(74) *Attorney, Agent, or Firm* — Birch, Stewart, Kolasch & Birch, LLP

(57) ABSTRACT

A regeneration control device of an electrically driven vehicle configured to control regeneration operation in which rotational energy of wheels is converted and regenerated into electric energy by a rotary electric motor, includes: a regeneration level selecting unit manually operated to select a regeneration level in the regeneration operation; a regeneration level setting unit changing the regeneration level to a stage in accordance with the operation on the regeneration level selecting unit; and a regeneration executing unit executing the regeneration operation in accordance with the stage of the regeneration level changed by the regeneration level setting unit. When a specific operation is performed on the regeneration level selecting unit, the regeneration level setting unit changes the regeneration level to a highest stage in one of an up direction and a down direction.

20 Claims, 10 Drawing Sheets

(51) Int. Cl.
*B60L 7/26* (2006.01)
*B60L 7/14* (2006.01)
*B60L 11/18* (2006.01)
*H02P 3/14* (2006.01)
*F16H 59/02* (2006.01)

(52) U.S. Cl.
CPC ............ B60L 11/1861 (2013.01); H02P 3/14 (2013.01); *B60L 2240/12* (2013.01); *B60L 2240/24* (2013.01); *B60L 2240/36* (2013.01); *B60L 2240/425* (2013.01); *B60L 2240/525* (2013.01); *B60L 2240/642* (2013.01); *F16H 2059/0252* (2013.01)

(58) Field of Classification Search
CPC ............ B60L 2240/24; B60L 2240/36; B60L 2240/425; B60L 2240/525; B60L 2240/642; H02P 3/14; F16H 2059/0252
See application file for complete search history.

(56) References Cited

U.S. PATENT DOCUMENTS

| | | | |
|---|---|---|---|
| 2005/0228554 | A1 | 10/2005 | Yamamoto et al. |
| 2006/0196712 | A1* | 9/2006 | Toyota ................... B60K 6/445 180/165 |
| 2011/0260842 | A1* | 10/2011 | Colley .................... G06F 3/016 340/407.2 |
| 2014/0180518 | A1* | 6/2014 | Hayashi ............. B60L 15/2009 701/22 |
| 2014/0379190 | A1* | 12/2014 | Sawada .................... B60T 1/10 701/22 |
| 2015/0258897 | A1* | 9/2015 | Okada ....................... B60L 7/14 318/376 |

FOREIGN PATENT DOCUMENTS

| | | | |
|---|---|---|---|
| EP | 2 749 446 A2 | 7/2014 | |
| FR | 2856455 A1 * | 12/2004 | ......... F16H 59/0204 |
| FR | 2 989 345 A1 | 10/2013 | |
| JP | 2005-168283 A | 6/2005 | |

\* cited by examiner

REGENERATION CONTROL DEVICE OF ELECTRICALLY DRIVEN VEHICLE

CROSS-REFERENCE TO RELATED APPLICATION(S)

This application is based upon and claims the benefit of priority from prior Japanese patent application No. 2015-153593, filed on Aug. 3, 2015, the entire contents of which are incorporated herein by reference.

BACKGROUND

The present invention relates to a regeneration control device which controls regeneration operation in an electrically driven vehicle using a rotary electric motor as a driving source.

For example, a technique is available in which, in an electrically driven vehicle such as an electric vehicle (EV) or a hybrid electric vehicle (HEV), a rotary electric motor is controlled to generate electric power during deceleration of the vehicle etc., that is, regeneration operation is executed so that braking force can be obtained while a battery is charged with the generated electric power.

There is a fear that the braking force (regenerative braking force) caused by such regeneration operation may affect the behavior of the vehicle to thereby lower operability or comfortability of the vehicle. To solve this problem, there is a technique which is designed to be able to adjust regenerative braking force (regeneration level) suitably according to the will of a driver. Specifically, there is a technique which is designed to increase or decrease deceleration in accordance with the number of times of operation on an operation section, for example, in a vehicle using an electric motor as a driving source (see JP-A-2005-168283).

The deceleration (regeneration level) is set suitably in accordance with the number of times of operation on the operation section (regeneration level selecting unit) as in the technique described in JP-A-2005-168283. Thus, it is possible to reduce the speed more suitably.

Assume that configuration is made in such a manner that the regeneration level can be set into multiple stages. To change the regeneration level from one of the multiple stages to another in this case, it is however necessary to operate the regeneration level selecting unit a number of times correspondingly to the number of the stages. There is therefore a fear that this operation is very burdensome to thereby adversely degrade the operability or comfortability of the vehicle.

SUMMARY

It is an object of the invention to provide a regeneration control device of an electrically driven vehicle which can improve operability of the vehicle during a regeneration operation.

In order to achieve the object, according to the invention, there is provided a regeneration control device of an electrically driven vehicle, the regeneration control device which is configured to control regeneration operation in which rotational energy of wheels provided in the electrically driven vehicle is converted and regenerated into electric energy by a rotary electric motor, the regeneration control device comprising: a regeneration level selecting unit which is manually operated to select a regeneration level in the regeneration operation; a regeneration level setting unit which is configured to change the regeneration level to a stage in accordance with the operation on the regeneration level selecting unit; and a regeneration executing unit which is configured to execute the regeneration operation in accordance with the stage of the regeneration level changed by the regeneration level setting unit, wherein, when a specific operation is performed on the regeneration level selecting unit, the regeneration level setting unit is configured to change the regeneration level to a highest stage in one of an up direction and a down direction.

DETAILED DESCRIPTION OF EXEMPLARY EMBODIMENTS

Embodiments of the invention will be described below in detail with reference to the drawings.

Embodiment 1

Figure 1:
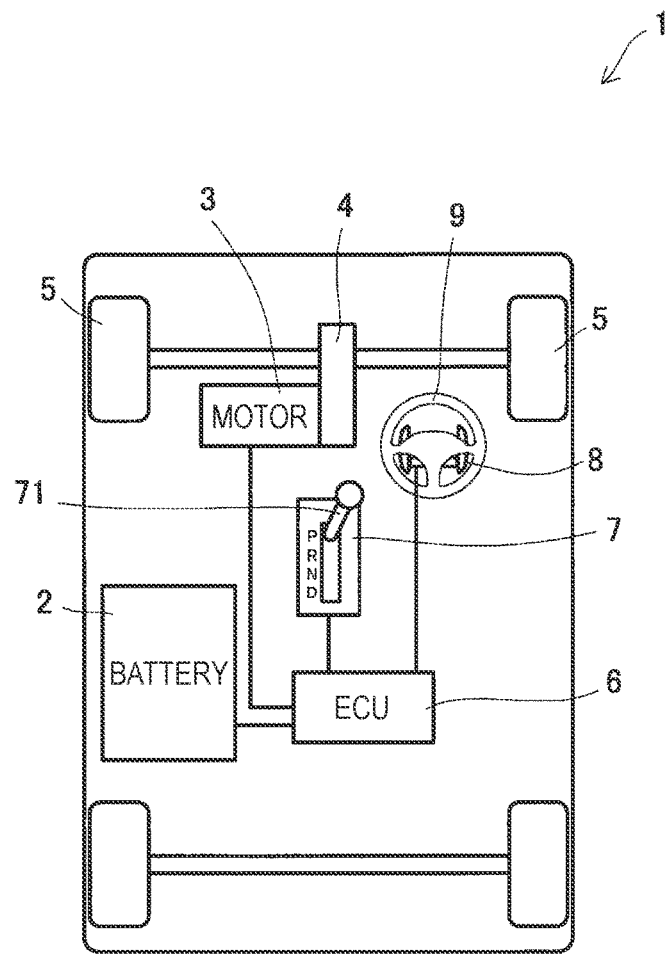
FIG. 1 is a view schematically showing the configuration of an electrically driven vehicle according to Embodiment 1 of the invention.

As shown in FIG. 1, an electrically driven vehicle 1 which is, for example, an electric vehicle is provided with a battery 2 and a driving motor (rotary electric motor) 3. The battery 2 is a rechargeable battery. The driving motor 3 is operated by electric power supplied from the battery 2. The driving motor 3 is connected to driving wheels (front wheels in the embodiment) 5 through a driving mechanism 4. Examples of the driving mechanism 4 include a CVT (Continuously Variable Transmission), a differential gear, etc. While driving the driving wheels 5 through the driving mechanism 4, the driving motor 3 receives rotation from the driving wheels 5 to generate electric power and supplies the electric power to the battery 2 during so-called regeneration operation. Such supply/reception of the electric power between the driving motor 3 and the battery 2 is controlled by an ECU (Electronic Control Unit) 6.

Incidentally, the ECU 6 is formed as an LSI device in which a CPU (microprocessor), an ROM, an RAM, etc. are integrated, or as an embedded electronic device. The ECU 6 is provided with a control program as software in order to perform various kinds of control including motor control.

In addition, a floor shift operation device 7, and a paddle switch device 8 which serves as a regeneration level selecting unit are connected to the ECU 6. The ECU 6 controls the driving motor 3 in accordance with a traveling state of the electric vehicle 1. In addition, the ECU 6 controls an output of the driving motor 3 suitably in accordance with operations performed on the floor shift operation device 7 and the paddle switch device 8 by a driver.

The floor shift operation device 7 is provided in a floor of the electrically driven vehicle 1, and includes a shift lever 71. The shift lever 71 is operated to perform changeover among shift positions such as a P (Parking) range, an R (Reverse) range, an N (Neutral) range and a D (Drive) range.

Figure 2:
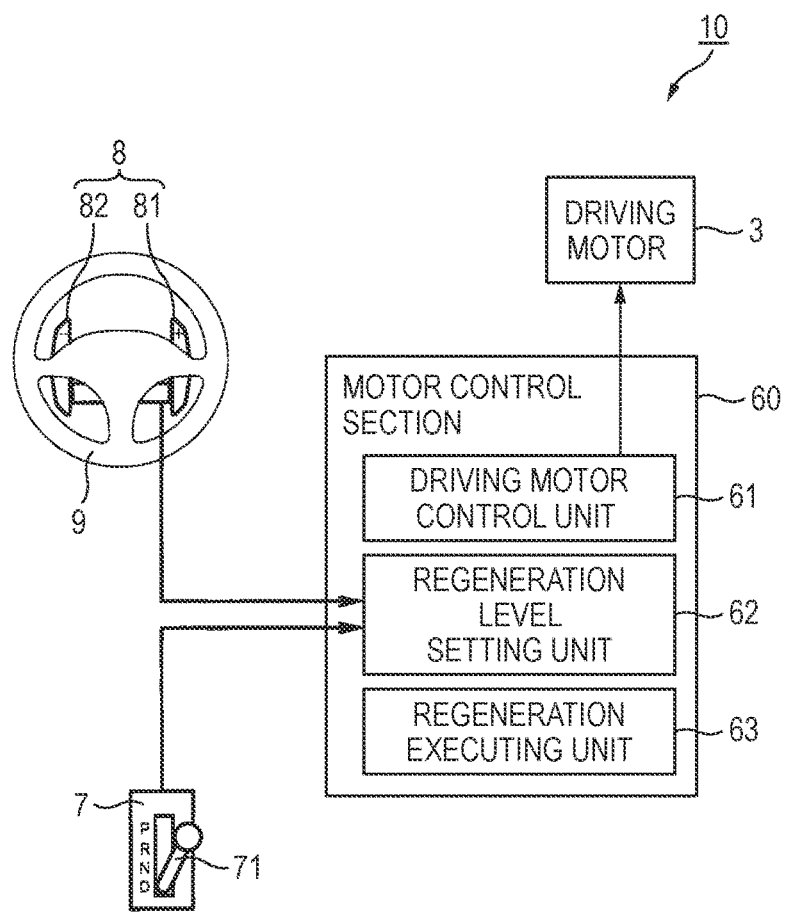
FIG. 2 is a block diagram schematically showing the configuration of a regeneration control device according to Embodiment 1 of the invention.

The paddle switch device 8 has a function as the regeneration level selecting unit which is manually operated to select a regeneration level in regeneration operation. In other words, the regeneration level means the degree of deceleration here. As the regeneration level is higher, the degree of deceleration is also higher. In the embodiment, the paddle switch device 8 is provided with a pair of switch levers 81 and 82. As shown in FIG. 2, the pair of switch levers 81 and 82 are attached to a shaft of a steering wheel 9 of the electrically driven vehicle 1. In addition, the pair of switch levers 81 and 82 are configured to be operable independently.

For example, in the state in which the D range has been set as the shift position by the floor shift operation device 7, the switch levers 81 and 82 can be operated to select the regeneration level during the regeneration operation. Specifically, the right switch lever 81 is a switch which outputs an instruction to raise the regeneration level (increase the deceleration) when the driver raises the right switch lever 81 toward the front side (the side of the steering wheel 9). An indication "+" is provided in the right switch lever 81. The left switch lever 82 is a switch which outputs an instruction to lower the regeneration level (decrease the deceleration). An indication "−" is provided in the left switch lever 82. It is a matter of course that the switch levers 81 and 82 may be disposed to be reversed with respect to left and right.

Figure 3:
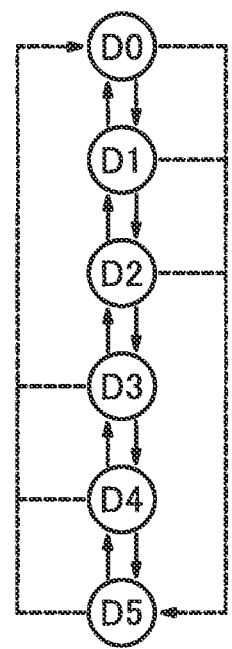
FIG. 3 is a view explaining change of a regeneration level caused by operation on a paddle switch device.

In the embodiment, the paddle switch device 8 is configured so that one of the switch levers 81 and 82 can be operated to select the regeneration level from six stages ranging from a stage D0 to a stage D5, as shown in FIG. 3. Incidentally, when the regeneration level is set at the stage D0, the regenerative force is weakest. When the regeneration level is set at the stage D5, the regenerative force is strongest. In addition, in the embodiment, regeneration is constantly executed. The default regeneration level is set at the stage D2.

Here, in the configuration in which the regeneration level can be selected from the multiple stages in this manner, there is a case where operation on the paddle switch device 8 may be troublesome. For example, assume that the driver wants to change the regeneration level from the stages D0 to D5 in the state in which the regeneration level has been set at the stage D0. In this case, the driver has to operate the switch lever 81 even five times. This results in poor operability.

To solve this problem, a regeneration control device 10 according to the invention is provided to change the regeneration level to the highest stage regardless of the current regeneration level as soon as a specific operation is performed on the paddle switch device 8, as will be described later. In this manner, operability can be improved.

As shown in FIG. 2, the regeneration control device 10 according to the embodiment includes the paddle switch device 8 and a motor control section 60. The motor control section 60 is included in the ECU 6. The motor control section 60 is provided with a driving motor control unit 61, a regeneration level setting unit 62, and a regeneration executing unit 63.

The driving motor control unit 61 suitably controls an output of the driving motor 3 in accordance with the traveling state etc. of the electrically driven vehicle 1. That is, the driving motor control unit 61 adjusts the supply of electric power to the driving motor 3 from the battery 2 in accordance with the traveling state of the electrically driven vehicle 1 to thereby control the operation (output) of the driving motor 3 suitably.

The regeneration level setting unit 62 suitably changes the regeneration level during the regeneration operation to a predetermined stage in accordance with an operation on the paddle switch device (regeneration level selecting unit) 8. That is, the regenerate level setting unit 62 changes the current regeneration level to one of the stages D0 to D5 selected by the paddle switch device 8. Incidentally, the current regeneration level indicated as which stage is displayed on an indicator etc. provided together with various meters, for example, in a not-shown instrument panel.

According to the embodiment, when the driver operates one of the switch levers 81 and 82 of the paddle switch device 8 once, the regeneration level setting unit 62 changes the regeneration level by one stage. For example, assume that the driver operates the switch lever (+) 81 once in the state in which the regeneration level has been set at the stage D0. In this case, the regeneration level setting unit 62 increases the regeneration level by one stage to thereby set the regeneration level at the stage D1 (see FIG. 3). When the driver operates the switch lever 81 again, the regeneration level setting unit 62 further increases the regeneration level by one stage from the stage D1 to the stage D2. Then, the regeneration level setting unit 62 increases the regeneration level sequentially whenever the driver operates the switch lever 81 once, with a result that the regeneration level setting unit 62 changes the regeneration level from the stage D3 to the stage D5.

For example, assume that the driver operates the switch lever (−) 82 once in the state in which the regeneration level has been set at the stage D5. In this case, the regeneration level setting unit 62 decreases the regeneration level by one stage to thereby set the regeneration level at the stage D4. When the driver operates the switch lever 82 again, the regeneration level setting unit 62 further decreases the regeneration level by one stage from the stage D4 to the stage D3. Then, the regeneration level setting unit 62 decreases the regeneration level sequentially whenever the driver operates the switch lever 82 once, with a result that the regeneration level setting unit 62 changes the regeneration level from the stage D2 to the stage D0.

Further, in the invention, when a specific operation is performed on the paddle switch device (regeneration level selecting unit) 8 within a predetermined time, the regeneration level setting unit 62 changes the regeneration level to the highest stage in the aforementioned one direction. In the embodiment, when the paddle switch device 8 is operated two or more times in one of the direction of increasing the regeneration level (hereinafter referred to as up direction) and the direction of decreasing the regeneration level (hereinafter referred to as down direction) within the predetermined time, the regeneration level setting unit 62 changes the regeneration level to the highest stage in the aforementioned one direction. For example, assume that the driver operates the switch lever 81 two or more times within the predetermined time (about 500 ms in the embodiment) in the state in which the regeneration level has been set at the stage D0. In this case, the regeneration level setting unit 62 changes the regeneration level to the stage D5 which is the highest stage in the up direction. That is, when the driver operates the switch lever 81 two or more times within a very short time, the regeneration level setting unit 62 changes the regeneration level to the stage D5 regardless of the current regeneration level.

To give more in detail, when the driver operates the switch lever 81 once in the state in which the regeneration level has been set at the stage D0, the regeneration level setting unit 62 first increases the regeneration level by one stage from the stage D0 to the stage D1. When the driver then operates the switch lever 81 the second time within the predetermined time, the regeneration level setting unit 62 increases the regeneration level from the stage D1 to the stage D5 which is the highest stage.

Thus, in the embodiment, when the driver operates the switch lever 81 two or more times within the predetermined time, the regeneration level setting unit 62 increases the regeneration level to the stage D5 which is the highest stage in two steps. However, it is a matter of course that the regeneration level setting unit 62 may increase the regeneration level to the stage D5 in one step. For example, after the fact that the driver operates the switch lever 81 two or more times within the predetermined time in the state in which the regeneration level has been set at the stage D0 is detected, the regeneration level setting unit 62 may change the regeneration level from the stage D0 to the stage D5 in one step.

In addition, assume that the driver operates the switch lever 81 two or more times within the predetermined time in the state in which the regeneration level has been set at the stage D1 or the stage D2. Also in this case, the regeneration level setting unit 62 changes the regeneration level to the stage D5 which is the highest stage in the up direction. On the other hand, assume that the driver operates the switch lever (−) 82 two or more times within the predetermined time in the state in which the regeneration level has been set at one of the stages D3 to D5. In this case, the regeneration level setting unit 62 changes the regeneration level to the stage D0 which is the highest stage in the down direction (see FIG. 3). That is, when the driver operates the switch lever 81 or 82 two or more times within the predetermined time, the regeneration level setting unit 62 changes the regeneration level from the current stage to the highest stage if there are at least two stages from the current stage of the regeneration level to the highest stage.

Thus, it is possible to reduce the number of times of operation on the switch lever 81 or 82 when the driver wants to select the highest stage as the regeneration level. Accordingly, operability is improved largely.

Incidentally, in the embodiment, assume that the driver presses one of the switch levers 81 and 82 for a long time when the regeneration level has been set at any of the stages D0 to D5. In this case, the regeneration level setting unit 62 changes the regeneration level to the stage D2 which is the default stage.

The regeneration executing unit 63 executes the so-called regeneration operation in which rotational energy of the driving wheels 5 is converted and regenerated into electric energy by the driving motor 3, for example, during deceleration etc. In the regeneration operation, rotation of the driving wheels 5 is used to generate electric power in the driving motor 3 and charge the battery 2 with the generated electric power. On this occasion, the regeneration executing unit 63 controls the driving motor 3 suitably so as to generate predetermined regenerative force (regenerative braking force) in accordance with the regeneration level of any of the stages D0 to D5 set by the regeneration level setting unit 62 as described above.

Regeneration level changing operation according to the embodiment will be further described below with reference to a flow chart of FIG. 4.

Figure 4:
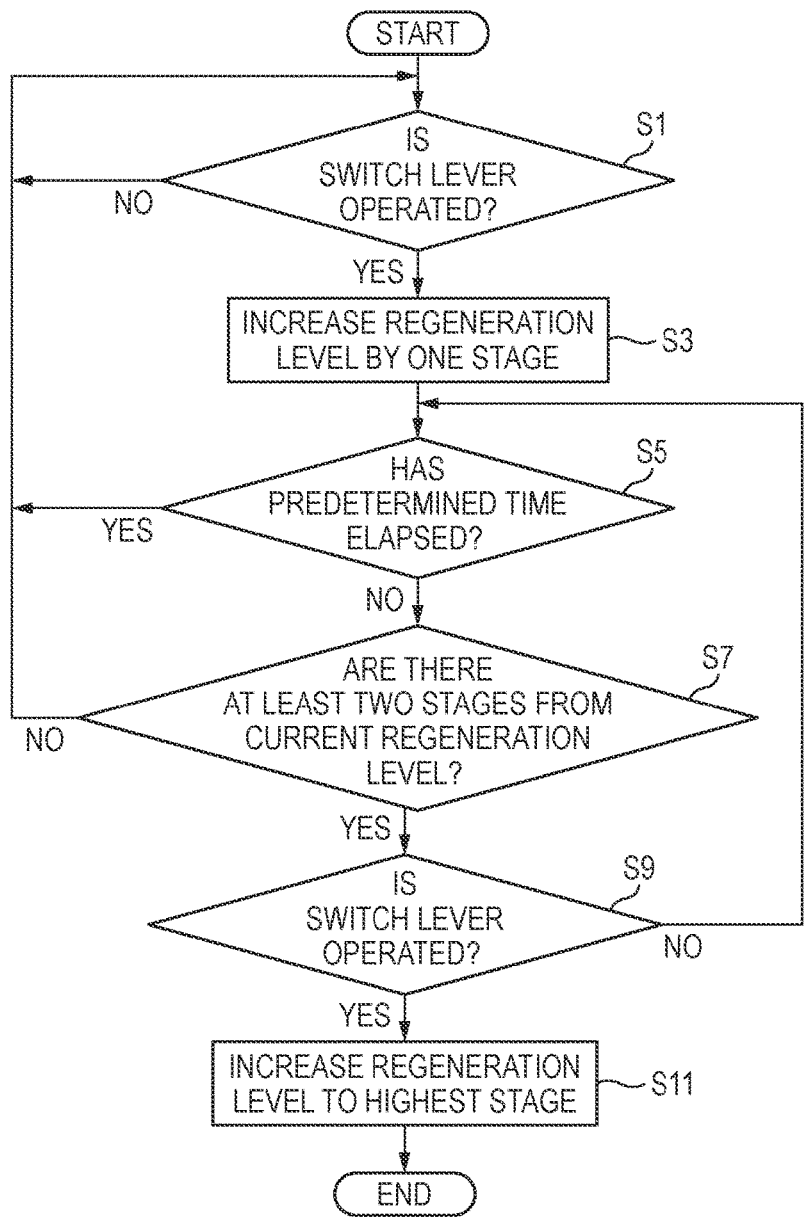
FIG. 4 is a flow chart explaining regeneration level changing operation according to Embodiment 1 of the invention.

The flow chart shown in FIG. 4 is an example of the case where the regeneration level is changed in the up direction. First, when the switch lever 81 is operated once by the driver in a step S1 (step S1: Yes), the regeneration level is increased by one stage in a step S3. For example, if the regeneration level is the stage D2 which is the default stage, the regeneration level is increased by one stage to be set at the stage D3. Next, determination is made as to whether a predetermined time (500 ms in the embodiment) has elapsed or not in a step S5. Here, when the predetermined time has not elapsed (step S5: No), the flow goes to a step S7 in which determination is made as to whether there are at least two stages or not from the current stage of the regeneration level to the highest stage. In other words, in the case of the embodiment, determination is made as to whether the current stage of the regeneration level is any of the stages D1 to D3 or not.

When there are not at least two stages from the current stage of the regeneration level to the highest stage (step S7: No), the flow returns to the step S1. When there are at least two stages from the current stage of the regeneration level to the highest stage (step S7: Yes), the flow goes to a step S9. When a second operation is performed on the switch lever 81 by the driver (step S9: Yes), the regeneration level is set at the stage D5 which is the highest stage in the up direction (step S11). On the other hand, when the second operation is not performed on the switch lever 81 by the driver (step S9: No), the flow returns to the step S5. When the predetermined time has elapsed (step S5: Yes), the flow returns to the step S1.

Embodiment 2

The embodiment is an example which is designed so that a stage to which a regeneration level can be changed is restricted when a predetermined regeneration level restriction condition is established even in the case where a switch lever 81 has been operated two or more times within a predetermined time.

Figure 5:
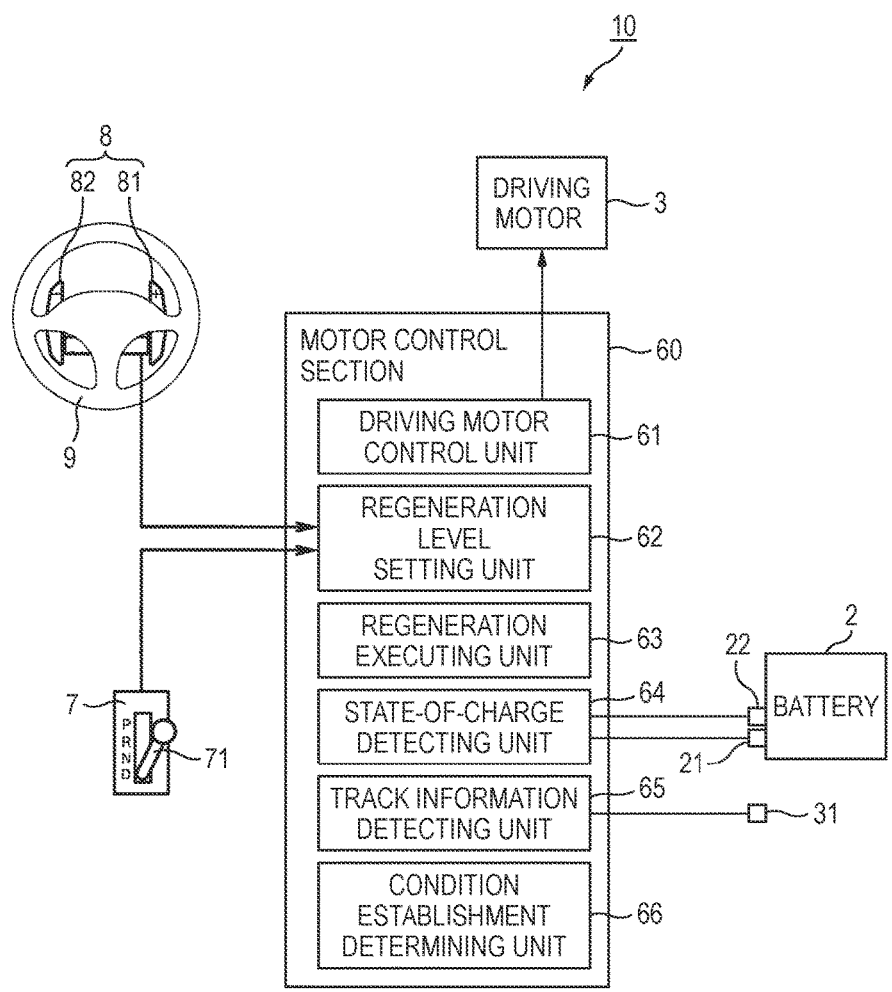
FIG. 5 is a block diagram schematically showing the configuration of a regeneration control device according to Embodiment 2 of the invention.

As shown in FIG. 5, a motor control section 60 constituting a regeneration control device 10 according to Embodiment 2 is provided with a driving motor control unit 61, a regeneration level setting unit 62 and a regeneration executing unit 63, and further provided with a state-of-charge detecting unit 64, a track information detecting unit 65 and a condition establishment determining unit 66.

The state-of-charge detecting unit 64 detects a state of charge (SOC) of a battery 2 provided in an electrically driven vehicle 1. For example, the state-of-charge detecting unit 64 calculates the SOC of the battery 2 from a preliminarily stored map based on voltage information detected by a voltage sensor 21 and current information detected by a current sensor 22. Both the voltage sensor 21 and the current sensor 22 are provided in the battery 2.

The track information detecting unit 65 detects information about a track where the electrically driven vehicle 1 is traveling. For example, in the embodiment, the electrically driven vehicle 1 is provided with an inclination sensor 31 which detects an inclination state of the vehicle. The track information detecting unit 65 detects whether the track is an uphill or downhill slope with at least a predetermined gradient or not, as one piece of the track information, based on information from the inclination sensor 31. Incidentally, the track information detecting unit 65 is not limited to a unit which serves for detecting the state of the track based on the information from the inclination sensor 31 but may be a unit which serves for detecting the state of the track, for example, from information of an in-vehicle camera etc.

At a predetermined timing, for example, when a paddle switch device 8 is operated two or more times by a driver within a predetermined time, the condition establishment determining unit 66 determines whether a predetermined regeneration level restriction condition is established or not. In the embodiment, when electric power which can be inputted to the battery 2 based on the state of charge (SOC) of the battery 2 detected by the state-of-charge detecting unit 64 is smaller than regenerative force which can be outputted by a driving motor 3 after a regeneration level is changed to the highest stage, the condition establishment determining unit 66 determines that the regeneration level restriction condition is established.

Figure 6:
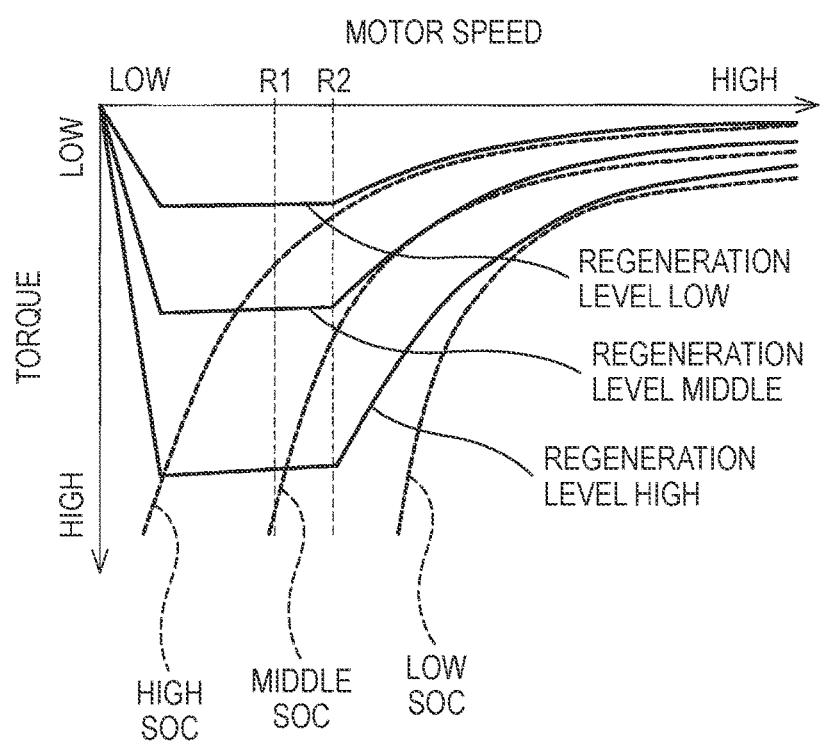
FIG. 6 is a graph showing the relation between motor speed and regenerative force (torque).

A method for determining whether the regeneration level restriction condition is established or not is not limited particularly. However, in the embodiment, determination is made in the following manner. The regeneration control device 10 according to the embodiment is provided with a map which defines the relation between motor speed and regenerative force (torque) as shown in FIG. 6. The condition establishment determining unit 66 determines whether the regeneration level restriction condition is established or not based on the map.

As shown in FIG. 6, as the regeneration level is higher, the regenerative force (torque) is higher. For example, the highest value of the regenerative force (torque) is lowest at a regeneration level "low" (for example, the stage D0). The highest value of the regenerative force becomes higher in the sequence of a regeneration level "middle" (for example, the stage D3) and a regeneration level "high" (for example, the stage D5). In addition, each dotted line in FIG. 6 designates a determination threshold for determining whether the electric power which can be inputted to the battery 2 is smaller or not than the regenerative force which can be outputted by the driving motor 3. The determination threshold is set in accordance with the magnitude of the SOC of the battery 2. In the example, the determination threshold is set in three stages, that is, a high SOC stage, a middle SOC stage and a low SOC stage.

When the regenerative force (torque) calculated from the motor speed, the current regeneration level, etc., based on the map shown in FIG. 6 is higher than the determination threshold, determination is made that the electric power which can be inputted to the battery 2 is smaller than the regenerative force which can be outputted by the driving motor 3. That is, the condition establishment determining unit 66 determines that the regeneration level restriction condition is established when the regenerative force (torque) is higher than the determination threshold. In the embodiment, the motor speed is detected by, for example, a motor speed detecting unit (not shown in drawings) provided in the electrically driven vehicle 1.

In the example of FIG. 6, for example, assume that the state of charge of the battery 2 is the "middle SOC" state and the motor speed is R1. In this case, the regenerative force (torque) is lower than the determination threshold even at the regeneration level "high" (for example, the stage D5). Accordingly, when the paddle switch device 8 is operated two or more times by the driver within the predetermined time, the condition establishment determining unit 66 determines that the regeneration level restriction condition is not established.

On the other hand, when the regeneration level is "high" (for example, the stage D5) in the case in which the motor speed is R2, the regenerative force (torque) is higher than the determination threshold. Accordingly, when the paddle switch device 8 is operated two or more times by the driver within the predetermined time, the condition establishment determining unit 66 determines that the regeneration level restriction condition is established.

When determination is made thus by the condition establishment determining unit 66 that the regeneration level restriction condition is established, the regeneration level setting unit 62 restricts the stage to which the regeneration level is to be changed even in the case where the switch lever 81 has been operated two or more times within the predetermined time. Thus, the regeneration level setting unit 62 prevents the regeneration level from being changed to the stage D5 which is the highest stage. That is, the regeneration level setting unit 62 sets (changes) the regeneration level at (to) a predetermined stage in accordance with the determination result of the condition establishment determining unit 66.

When determination is made by the condition establishment determining unit 66 that the regeneration level restriction condition is established, the regeneration level setting unit 62 changes the regeneration level to the highest stage within a range in which the regeneration level restriction condition is not established. For example, when the regeneration level is "middle" in the case where the motor speed is R2, the regeneration level restriction condition is not established. Accordingly, the regeneration level setting unit 62 changes the regeneration level to the stage D3.

In the case where the regeneration level restriction condition is established in this manner, the regeneration level to be changed is restricted. Thus, it is possible to change the regeneration level suitably in accordance with the traveling state of the electrically driven vehicle 1.

In the embodiment, assume that detection is made by the track information detecting unit 65 that the track where the electrically driven vehicle 1 is travelling is an uphill slope with at least a predetermined gradient. In this case, the regeneration level setting unit 62 weakens restriction of the regeneration level even when the regeneration level restriction condition is established. When the track is the uphill slope with at least the predetermined gradient, power consumption of the battery 2 is large. Therefore, it is conceived that desired regenerative force can be obtained during regeneration operation even when restriction of the regeneration level is weakened.

For example, when the regeneration level restriction condition is established, the regeneration level should be changed to the stage D3 as described above. Even in such a case, the regeneration level setting unit 62 changes the regeneration level to the stage D4 when the track is the uphill slope with at least the predetermined gradient.

Incidentally, as a method for weakening restriction of the regeneration level, the regeneration level setting unit 62 may correct the determination threshold shown in FIG. 6 so as to narrow the range in which the electric power which can be inputted to the battery 2 will be smaller than the regenerative force which can be outputted by the driving motor 3 after the regeneration level is changed to the highest stage.

On the other hand, when detection is made by the track information detecting unit 65 that the track in which the electrically driven vehicle 1 is travelling is a downhill slope with at least the predetermined gradient, the regeneration level setting unit 62 may strengthen restriction of the regeneration level. When the track is the downhill slope with at least the determined gradient, power consumption of the battery 2 is relatively small. Accordingly, it is conceived that desirable regenerative force can be obtained for only a short time during regeneration operation if restriction of the regeneration level is not strengthened.

Incidentally, when determination is made by the condition establishment determining unit 66 that the regeneration level restriction condition is not established, the regeneration level setting unit 62 changes the regeneration level to the stage D5 which is the highest stage, as described in Embodiment 1.

Regeneration level changing operation according to the embodiment will be further described below with reference to a flow chart of FIG. 7. Incidentally, since steps S1 to S9 are the same as those in Embodiment 1, description thereof will be omitted here.

Figure 7:
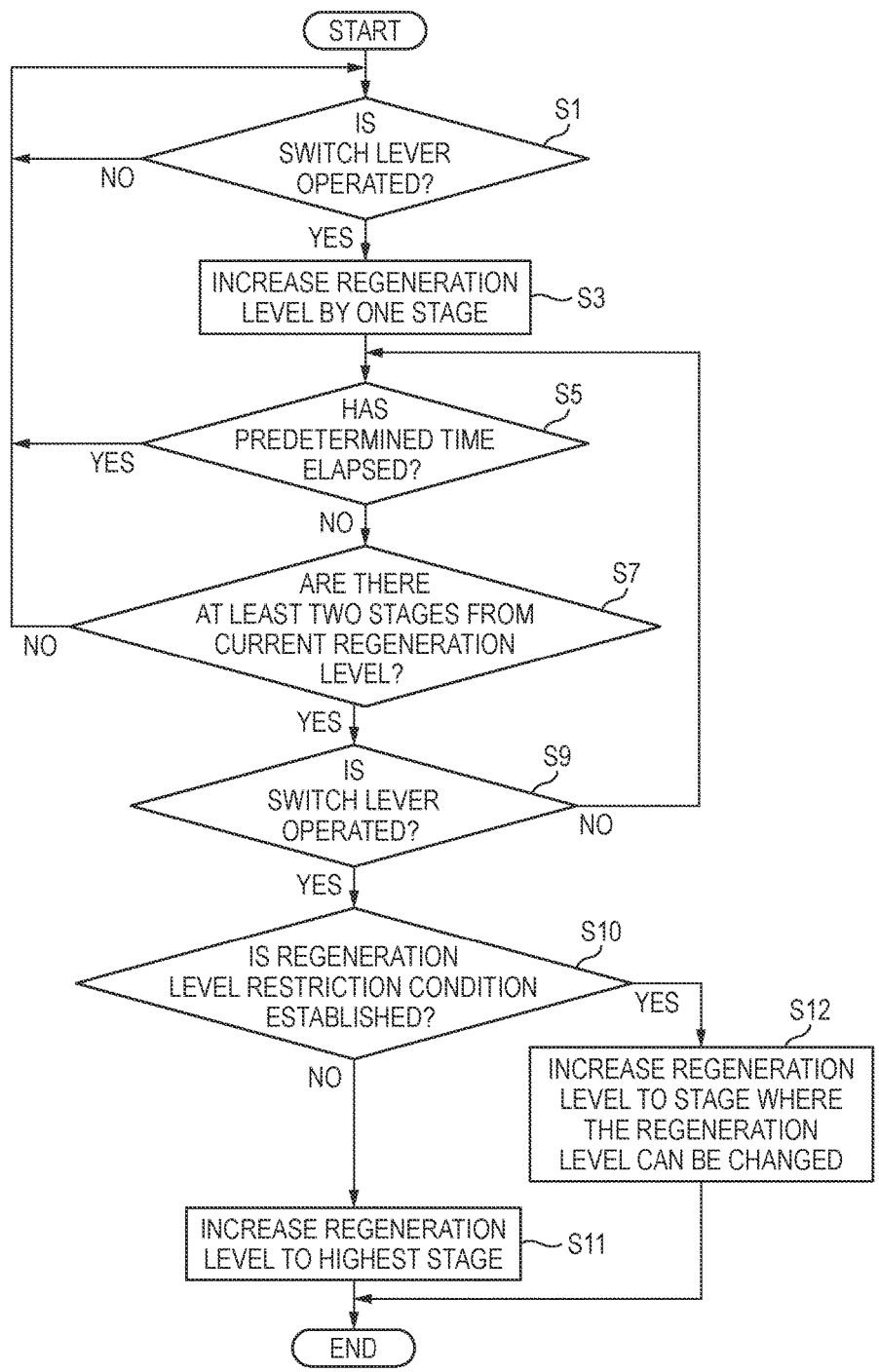
FIG. 7 is a flow chart explaining regeneration level changing operation according to Embodiment 2 of the invention.

As shown in FIG. 7, when the switch lever 81 is operated in the step S9 (step S9: Yes), determination is then made in a step S10 as to whether a predetermined regeneration level restriction condition is established or not. Specifically, determination is made as to whether electric power which can be inputted to the battery 2 is smaller or not than regenerative force which can be outputted by the driving motor 3 after the regeneration level is changed to the highest stage (stage D5), as described above. When determination is made that the electric power which can be inputted to the battery 2 is larger than the regenerative force which can be outputted by the driving motor 3 after the regeneration level is changed to the highest stage (stage D5), that is, determination is made that the regeneration level restriction condition is not established (step 10: No), the flow goes to a step S11 in which the regeneration level is set at the stage D5 which is the highest stage in the up direction. On the other hand, when the regeneration level restriction condition is established (step S10: Yes), the flow goes to a step S12 in which the regeneration level is changed to the highest stage in a range in which the regeneration level restriction condition is not established. On this occasion, when the track in which the electrically driven vehicle 1 is travelling is an uphill slope with at least the predetermined gradient, restriction of the regeneration level may be weakened as described above.

When the regeneration level restriction condition is established in this manner, the regeneration level to be changed can be controlled suitably so that the regeneration level can be changed suitably in accordance with the travelling state of the electrically driven vehicle 1.

Incidentally, the embodiment has a configuration in which when the switch lever 81 is operated in the step S9, determination is made as to whether the predetermined regeneration level restriction condition is established or not (step S10). However, configuration may be made so that when the switch lever 81 is operated in the step S1, determination can be also made as to whether the predetermined regeneration level restriction condition is established or not. In this case, when determination after the step S1 is made that the regeneration level restriction condition is established, processing is terminated directly without increasing the regeneration level by one stage. Thus, it is possible to change the regeneration level more suitably.

Embodiment 3

The embodiment is a modification of Embodiment 2. Specifically, the embodiment is an example which is designed so that determination is made that a regeneration level restriction condition is established when an electrically driven vehicle is traveling on a curve.

Figure 8:
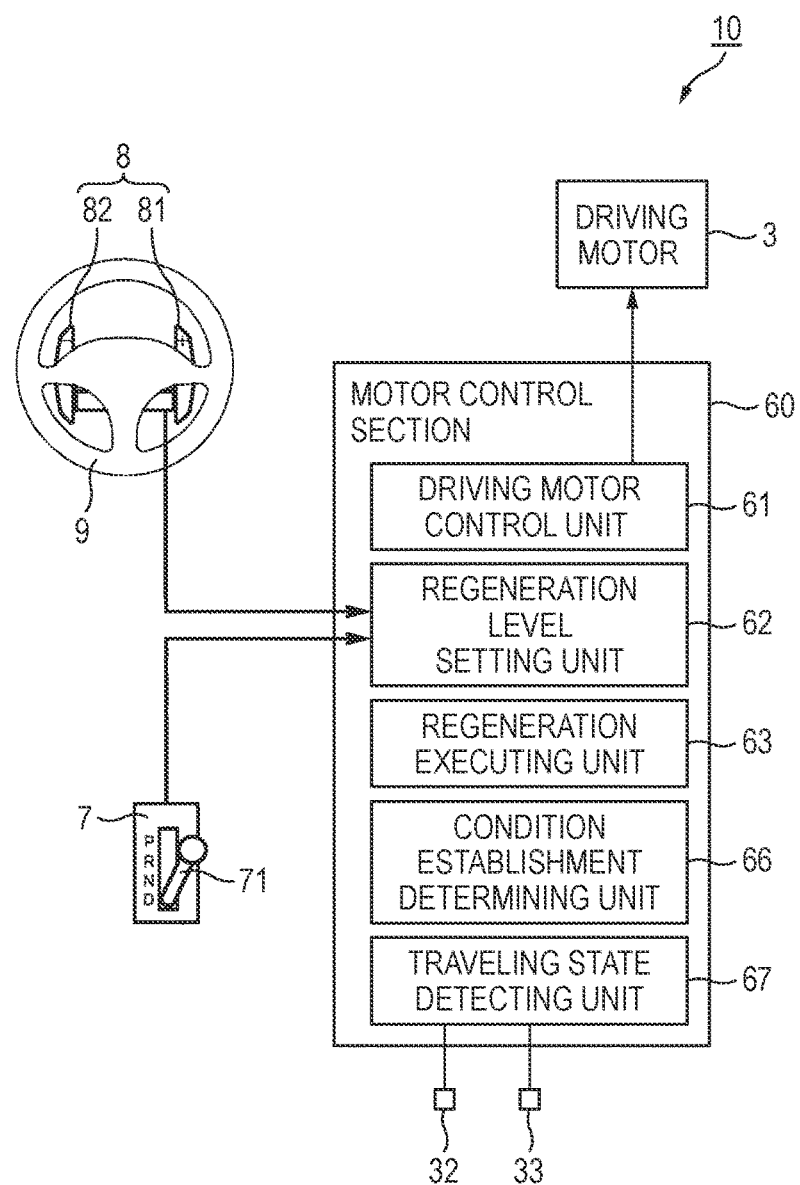
FIG. 8 is a block graph schematically showing the configuration of a regeneration control device according to Embodiment 3 of the invention.

As shown in FIG. 8, a motor control section 60 constituting a regeneration control device 10 according to Embodiment 3 is not only provided with a driving motor control unit 61, a regeneration level setting unit 62, a regeneration executing unit 63 and a condition establishment determining unit 66, but also provided with a traveling state detecting unit 67.

The traveling state detecting unit 67 detects a traveling state of an electrically driven vehicle 1. For example, in the embodiment, the electrically driven vehicle 1 is provided with various sensors such as a vehicle speed sensor (a vehicle speed detecting unit) 32 which serves for detecting vehicle speed and a steering angle sensor (a steering angle detecting unit) 33 which serves for detecting an angle of a steering wheel 9. The traveling state detecting unit 67 detects the traveling state of the electrically driven vehicle 1 based on pieces of information from these sensors. Specifically, as one of travelling states of the electrically driven vehicle 1, the traveling state detecting unit 67 detects, for example, whether the electrically driven vehicle 1 is traveling on a curve with a radius of curvature not lower than a predetermined value or not, based on the information from the steering angle sensor 33. It is a matter of course that the method for detecting whether the electrically driven vehicle 1 is travelling on a curve or not is not limited particularly but may be, for example, based on a detection result of a horizontal acceleration sensor when the electrically driven vehicle 1 is provided with the horizontal acceleration sensor.

When detection is made by the traveling state detecting unit 67 that the electrically driven vehicle 1 is traveling on a curve, the condition establishment determining unit 66 determines that a regeneration level restriction condition is established.

When determination is made thus by the condition establishment determining unit 66 that the regeneration level restriction condition is established, the regeneration level setting unit 62 restricts the stage to which the regeneration level is to be changed, even in the case where the switch lever 81 has been operated two or more times within a predetermined time.

Figure 9:
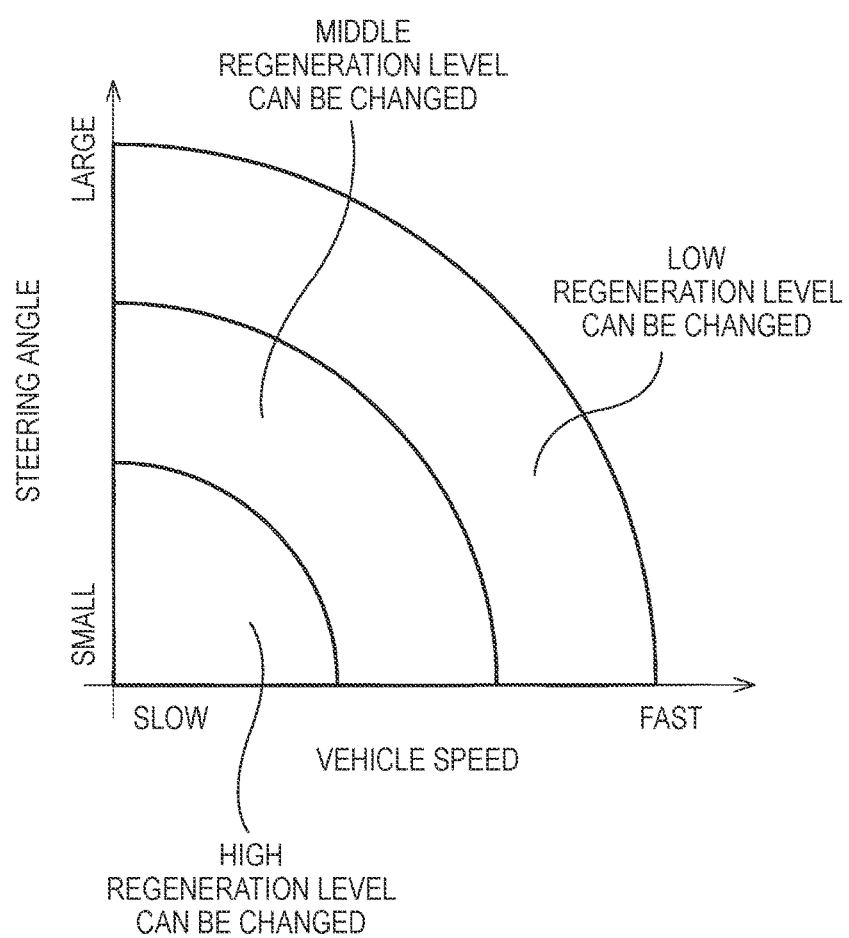
FIG. 9 is a graph showing the relation of a changeable regeneration level to vehicle speed and a steering angle.

For example, the regeneration control device 10 according to the embodiment is provided with a map defining a changeable regeneration level based on vehicle speed and a steering angle as shown in FIG. 9. The regeneration level setting unit 62 determines the changeable regeneration level based on the map. The example shown in FIG. 9 corresponds to a case where the switch lever 81 is operated, that is, a case where the stage of the regeneration level is increased. As the vehicle speed is higher, the changeable regeneration level is lower. In addition, as the steering angle is larger, the changeable regeneration level is lower.

Thus, as the vehicle speed is higher or as the steering angle is larger, sudden deceleration during regeneration operation is suppressed. Accordingly, traveling safety can be secured though the regeneration level is changed when the electrically driven vehicle 1 is traveling on a curve.

Incidentally, in the map defining the changeable regeneration level, not only the aforementioned vehicle speed and the aforementioned steering angle but also other conditions such as vehicle weight may be taken into consideration. The regeneration level setting unit 62 may determine the changeable regeneration level without using the map shown in FIG. 9. For example, the regeneration level setting unit 62 may restrict the stage to which the regeneration level is to be changed as the vehicle speed which is detected by the vehicle speed sensor 32 is higher or as the angle of the steering wheel 9 which is detected by the steering angle sensor 33 is larger.

Embodiment 4

The embodiment is a modification of Embodiment 2. Specifically, the embodiment is an example which is designed so that determination is made that a regeneration level restriction condition is established when temperature of each of high voltage devices provided in an electrically driven vehicle 1 is not lower than a predetermined temperature.

Figure 10:
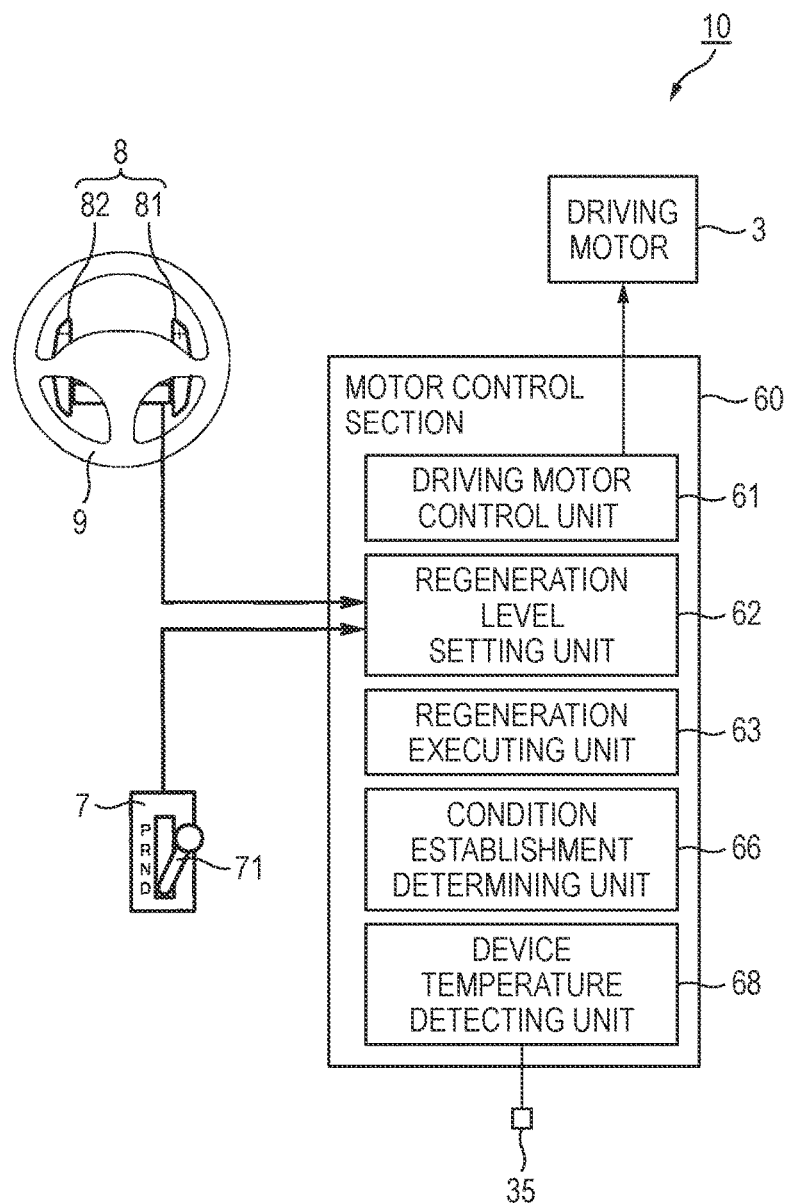
FIG. 10 is a block diagram schematically showing the configuration of a regeneration control device according to Embodiment 4 of the invention.

As shown in FIG. 10, a motor control section 60 constituting a regeneration control device 10 according to Embodiment 4 is not only provided with a driving motor control unit 61, a regeneration level setting unit 62, a regeneration executing unit 63 and a condition establishment determining unit 66, but also provided with a device temperature detecting unit 68.

The device temperature detecting unit 68 detects the temperatures of the high voltage devices provided in the electrically driven vehicle 1, such as a driving motor 3, an inverter for operating the driving motor 3, and a CPU for controlling the driving motor 3. For example, in the embodiment, the electrically driven vehicle 1 is provided with a temperature sensor 35 which detects the temperature of each of the high voltage devices. The device temperature detecting unit 68 detects the temperature of the high voltage device provided in the electrically driven vehicle 1 based on information from the temperature sensor 35.

When detection is made by the device temperature detecting unit 68 that the temperature of the high voltage device provided in the electrically driven vehicle 1 is equal to or higher than the predetermined temperature, the condition establishment determining unit 66 determines that the regeneration level restriction condition is established.

When determination is made thus by the condition establishment determining unit 66 that the regeneration level restriction condition is established, the regeneration level setting unit 62 suitably restricts the stage to which the regeneration level is to be changed in the same manner as described in Embodiment 2 etc., even in the case where the switch lever 81 has been operated two or more times within a predetermined time.

Incidentally, the regeneration control device 10 is provided with the map which defines the relation between the temperature of each of the high voltage devices and the changeable regeneration level. The regeneration level setting unit 62 changes the regeneration level suitably with reference to the map. Specifically, as the temperature of the high voltage device is higher, the regeneration level is set to be lower.

Thus, it is possible to suppress breakdown of each of the high voltage devices of the electrically driven vehicle 1. When the stage of the regeneration level is increased, the generated heat amount of the high voltage device during regeneration operation increases accordingly. Therefore, when the regeneration level is too high in the state in which the temperature of the high voltage device is relatively high, there is a fear that the breakdown of the high voltage device may be caused by the high temperature. However, when the stage to which the regeneration level is to be changed is restricted suitably in accordance with the temperature of the high voltage device as in the embodiment, it is possible to suppress the breakdown of the high voltage device.

Other Embodiments

Although the embodiments of the invention have been described above, the invention is not limited to the aforementioned embodiments.

For example, in the aforementioned embodiments, the case where one of the switch levers constituting the paddle switch device is operated two or more times has been described as an example of the specific operation on the regeneration level selecting unit. However, the specific operation on the regeneration level selecting unit is not limited thereto. For example, the "specific operation" may be a combination of an operation of clicking the switch lever by a normal length of time (predetermined time), and a long-pressing operation of clicking the switch lever for a longer time than normally (a time longer than the predetermined time).

In addition, the "specific operation" may be a long-pressing operation on the switch lever, which is an operation for a time longer than the predetermined time. Incidentally, in the aforementioned embodiments, when the driver presses the switch lever for a long time, the regeneration level is changed to the stage D2 which is the default stage. Accordingly, when the "specific operation" is the long-pressing operation on the switch lever, an operation for changing the regeneration level to the default stage has to be changed to another operation.

Further, for example, the paddle switch device may be used as a two-stage switch to distinguish between an operation of changing the regeneration level normally (an operation with a predetermined amount), and an operation of changing the regeneration level to the highest stage in one of an up direction and a down direction (an operation with an amount larger than the predetermined amount) in accordance with the operation amount of the switch lever. In addition, the aforementioned embodiments have been described in the example in which the switch lever is raised up toward the front as the "specific operation". However, the "specific operation" may be an operation of pushing the switch lever down toward the front.

In addition, the invention has been described in the aforementioned embodiments each of which basically shows an example in which the regeneration level is increased. It is however a matter of course that the invention can be also applied to the case where the regeneration level is decreased.

For example, although the paddle switch device 8 has been illustrated as an example of the regeneration level selecting unit in the aforementioned embodiments, the configuration of the regeneration level selecting unit is not limited particularly. For example, the floor shift operation device 7 may be provided with a function as the regeneration level selecting unit. Further, the regeneration level selecting unit may be, for example, constituted by a column shift, an instrument panel shift or a momentary shift etc.

In addition, although the invention has been described in the aforementioned embodiments in which an electric vehicle is used as the electrically driven vehicle by way of example, it is a matter of course that the invention can be also applied to another vehicle such as a hybrid electric vehicle which is provided with an engine (internal-combustion engine) and a driving motor.

According to the regeneration control device according to the invention, when a driver wants to change the regeneration level to the highest stage in the up (deceleration increasing) direction or the down (deceleration decreasing) direction, the driver can operate the regeneration level selecting unit a small number of times regardless of the current regeneration level to thereby change the regeneration level to the highest stage. Accordingly, it is possible to improve operability of the vehicle during regeneration operation.

What is claimed is:

1. A regeneration control device of an electrically driven vehicle, the regeneration control device which is configured to control regeneration operation in which rotational energy of wheels provided in the electrically driven vehicle is converted and regenerated into electric energy by a rotary electric motor, the regeneration control device comprising:
   a regeneration level selector, manually operated to select a regeneration level in the regeneration operation;
   a processing device and a storage device storing instructions that cause the processing device to,
   change, as a regeneration level setter, the regeneration level to a stage in accordance with the operation on the regeneration level selector; and
   execute, as a regeneration executor, the regeneration operation in accordance with the stage of the regeneration level changed by the regeneration level selector;
   determine whether an operation of the regeneration level selector other than a specific operation is performed;
   change the regeneration level in one of an up direction and a down direction by one stage when the determined operation is the operation other than the specific operation;
   determine whether at least two stages exist between a current stage and a highest stage in one of the up direction and the down direction, and
   determine whether a specific operation is performed on the regeneration level selector, wherein
   when the specific operation is determined to be performed on the regeneration level selector and the at least two stages are determined to exist, the instructions cause the processing device to change the regeneration level directly to the highest stage by skipping multiple regeneration levels between the current regeneration level and the regeneration level of the highest stage.

2. The regeneration control device according to claim 1, wherein the instructions further cause the processing device to
   determine, as a condition establishment determiner, whether a predetermined regeneration level restriction condition is established or not, and wherein,
   when the condition establishment determiner determines that the regeneration level restriction condition is established, the regeneration level selector is configured to restrict the stage to which the regeneration level is to be changed, to thereby prevent the regeneration level from being changed to the highest stage in a case where the specific operation has been performed on the regeneration level selector.

3. The regeneration control device according to claim 2, wherein the instructions further cause the processing device to,
   detect, as a state-of-charge detector, a state of charge of a battery provided in the electrically driven vehicle, and wherein,
   when electric power which can be inputted to the battery based on the detected state of charge of the battery is smaller than regenerative force which can be outputted by the rotary electric motor after the regeneration level is changed to the highest stage, the condition establishment determiner determines that the regeneration level restriction condition is established.

4. The regeneration control device according to claim 3, wherein the instructions further cause the processing device to,
   detect, as a traveling state detector, a traveling state of the electrically driven vehicle, and wherein,
   when the traveling state detector detects that the electrically driven vehicle is traveling on a curve, the condition establishment determiner determines that the regeneration level restriction condition is established.

5. The regeneration control device according to claim 4, wherein the instructions further cause the processing device to,
   detect, as a device temperature detector, temperature of a high voltage device provided in the electrically driven vehicle, and wherein,
   when the detected temperature is equal to or higher than a predetermined value, the condition establishment determiner determines that the regeneration level restriction condition is established.

6. The regeneration control device according to claim 3, wherein the instructions further cause the processing device to,
   detect, as a device temperature detector, temperature of a high voltage device provided in the electrically driven vehicle, and wherein,
   when the detected temperature is equal to or higher than a predetermined value, the condition establishment determiner determines that the regeneration level restriction condition is established.

7. The regeneration control device according to claim 3, wherein the instructions further cause the processing device to,
   detect, as a track information detector, information about a track in which the electrically driven vehicle is traveling, and wherein,
   when the track information detector detects that the track is an uphill slope in a state where the regeneration level restriction condition is established, the regeneration level setter weakens restriction on the stage to which the regeneration level is to be changed.

8. The regeneration control device according to claim 3, wherein,
   when the regenerative force which can be outputted by the rotary electric motor after the regeneration level is changed to the highest stage, and which is calculated based on a map that defines relation between a motor speed of the rotary electric motor and the regenerative force is higher than a determination threshold that is set in accordance with the state of charge of the battery, the condition establishment determiner determines that the regeneration level restriction condition is established.

9. The regeneration control device according to claim 2, wherein the instructions further cause the processing device to,
   detect, as a traveling state detector, a traveling state of the electrically driven vehicle, and wherein,
   when the traveling state detector detects that the electrically driven vehicle is traveling on a curve, the condition establishment determiner determines that the regeneration level restriction condition is established.

10. The regeneration control device according to claim 9, wherein the instructions further cause the processing device to, detect, as a device temperature detector, temperature of a high voltage device provided in the electrically driven vehicle, and wherein, when the detected temperature is equal to or higher than a predetermined value, the condition establishment determiner determines that the regeneration level restriction condition is established.

11. The regeneration control device according to claim 9, wherein the instructions further cause the processing device to, detect, as a track information detector, information about a track in which the electrically driven vehicle is traveling, and wherein, when the track information detector detects that the track is an uphill slope in a state where the regeneration level restriction condition is established, the regeneration level setter weakens restriction on the stage to which the regeneration level is to be changed.

12. The regeneration control device according to claim 9, further comprising:

a vehicle speed detector, detecting vehicle speed of the electrically driven vehicle; and a steering angle detector, detecting an angle of a steering wheel of the electrically driven vehicle, wherein, when the traveling state detector detects that the electrically driven vehicle is traveling on the curve, and the condition establishment determiner determines that the regeneration level restriction condition is established, the regeneration level setter restricts the stage to which the regeneration level is to be changed as the vehicle speed detected by the vehicle speed detector is higher or as the angle of the steering wheel detected by the steering angle detector is larger.

13. The regeneration control device according to claim 2, wherein the instructions further cause the processing device to, detect, as a device temperature detector, temperature of a high voltage device provided in the electrically driven vehicle, and wherein, when the detected temperature of the high voltage device is equal to or higher than a predetermined value, the condition establishment determiner determines that the regeneration level restriction condition is established.

14. The regeneration control device according to claim 13, wherein the instructions further cause the processing device to, detect, as a track information detector, information about a track in which the electrically driven vehicle is traveling, and wherein, when the track information detector detects that the track is an uphill slope in a state where the regeneration level restriction condition is established, the regeneration level setter weakens restriction on the stage to which the regeneration level is to be changed.

15. The regeneration control device according to claim 2, wherein the instructions further cause the processing device to, detect, as a track information detector, information about a track in which the electrically driven vehicle is traveling, and wherein, when the track information detector detects that the track is an uphill slope in a state where the regeneration level restriction condition is established, the regeneration level setter weakens restriction on the stage to which the regeneration level is to be changed.

16. The regeneration control device according to claim 2, wherein the instructions further cause the processor to, detect, as a track information detector, information about a track in which the electrically driven vehicle is traveling, and wherein, when the track information detector detects that the track is a downhill slope in a state where the regeneration level restriction condition is established, the regeneration level setter strengthens restriction on the stage to which the regeneration level is to be changed.

17. The regeneration control device according to claim 1, wherein, when the regeneration level selector is operated two or more times in one of the up direction and the down direction within a predetermined time, the regeneration level setter changes the regeneration level to the highest stage in the one of the up direction and the down direction.

18. The regeneration control device according to claim 1, wherein, when the regeneration level selector is operated one time for a time, which is longer than a predetermined time, in the one of the up direction and the down direction, the regeneration level setter changes the regeneration level to the highest stage in the one of the up direction and the down direction.

19. The regeneration control device according to claim 1, wherein, when the regeneration level selector is operated with an operation amount, which is larger than a predetermined amount, in the one of the up direction and the down direction within a predetermined time, the regeneration level setter changes the regeneration level to the highest stage in the one of the up direction and the down direction.

20. A regeneration control device of an electrically driven vehicle, the regeneration control device which is configured to control regeneration operation in which rotational energy of wheels provided in the electrically driven vehicle is converted and regenerated into electric energy by a rotary electric motor, the regeneration control device comprising:

a regeneration level selector, manually operated to select a regeneration level in the regeneration operation;

a processing device and a storage device storing instructions that cause the processing device to, change, as a regeneration level setter, the regeneration level to a stage in accordance with the operation on the regeneration level selector; and execute, as a regeneration executor, the regeneration operation in accordance with the stage of the regeneration level changed by the regeneration level selector, wherein, when a specific operation is performed on the regeneration level selector, the instructions cause the processing device to change the regeneration level directly to a highest stage in one of an up direction and a down direction by skipping multiple regeneration levels between a current regeneration level and the regeneration level of the highest stage, wherein the instructions further cause the processing device to determine, as a condition establishment determiner, whether a predetermined regeneration level restriction condition is established or not, and wherein, when the condition establishment determiner determines that the regeneration level restriction condition is established, the regeneration level selector is configured to restrict the stage to which the regeneration level is to be changed, to thereby prevent the regeneration level from being changed to the highest stage in a case where the specific operation has been performed on the regeneration level selector, wherein the instructions further cause the processing device to, detect, as a state-of-charge detector, a state of charge of a battery provided in the electrically driven vehicle, wherein, when electric power which can be inputted to the battery based on the detected state of charge of the battery is smaller than regenerative force which can be outputted by the rotary electric motor after the regeneration level is changed to the highest stage, the condition establishment determiner determines that the regeneration level restriction condition is established, and wherein when the regenerative force which can be outputted by the rotary electric motor after the regeneration level is changed to the highest stage, and which is calculated based on a map that defines relation between a motor speed of the rotary electric motor and the regenerative force is higher than a determination threshold that is set in accordance with the state of charge of the battery, the condition establishment determiner determines that the regeneration level restriction condition is established.

\* \* \* \* \*